Oct. 26, 1971     H. J. SOBIN     3,614,922
NATURAL AIR COOLING SYSTEM
Filed Sept. 4, 1969     3 Sheets-Sheet 1
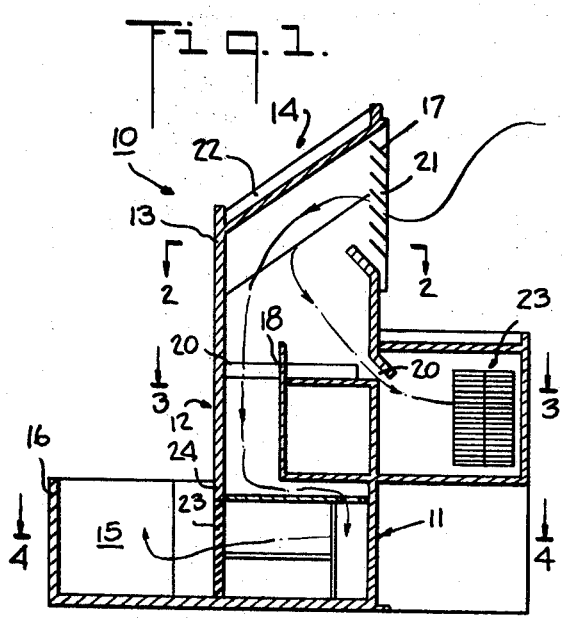
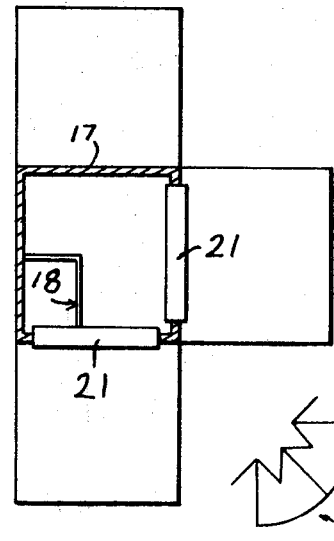
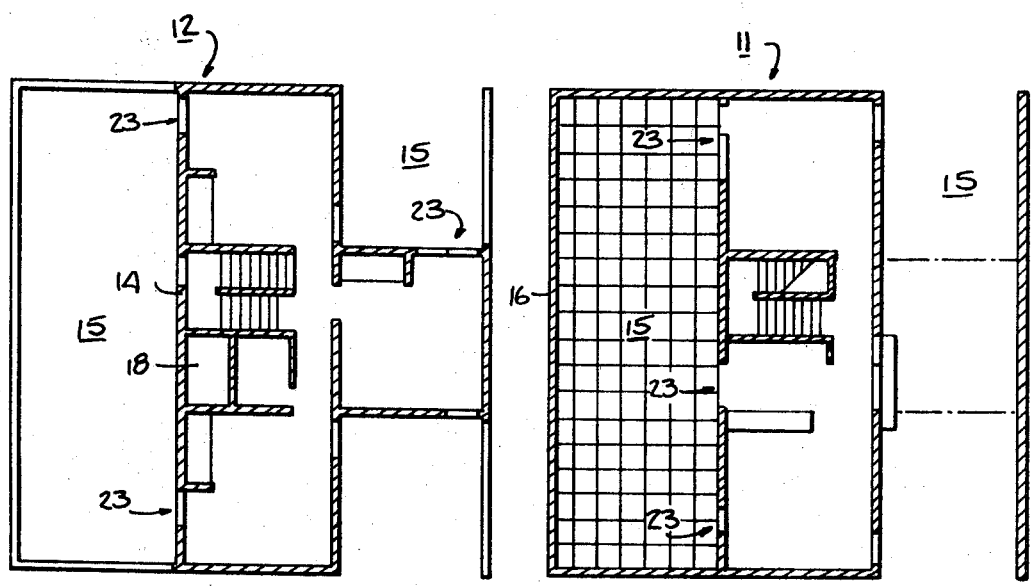
INVENTOR.
HARRIS SOBIN
BY
Kenyon & Kenyon
ATTORNEYS

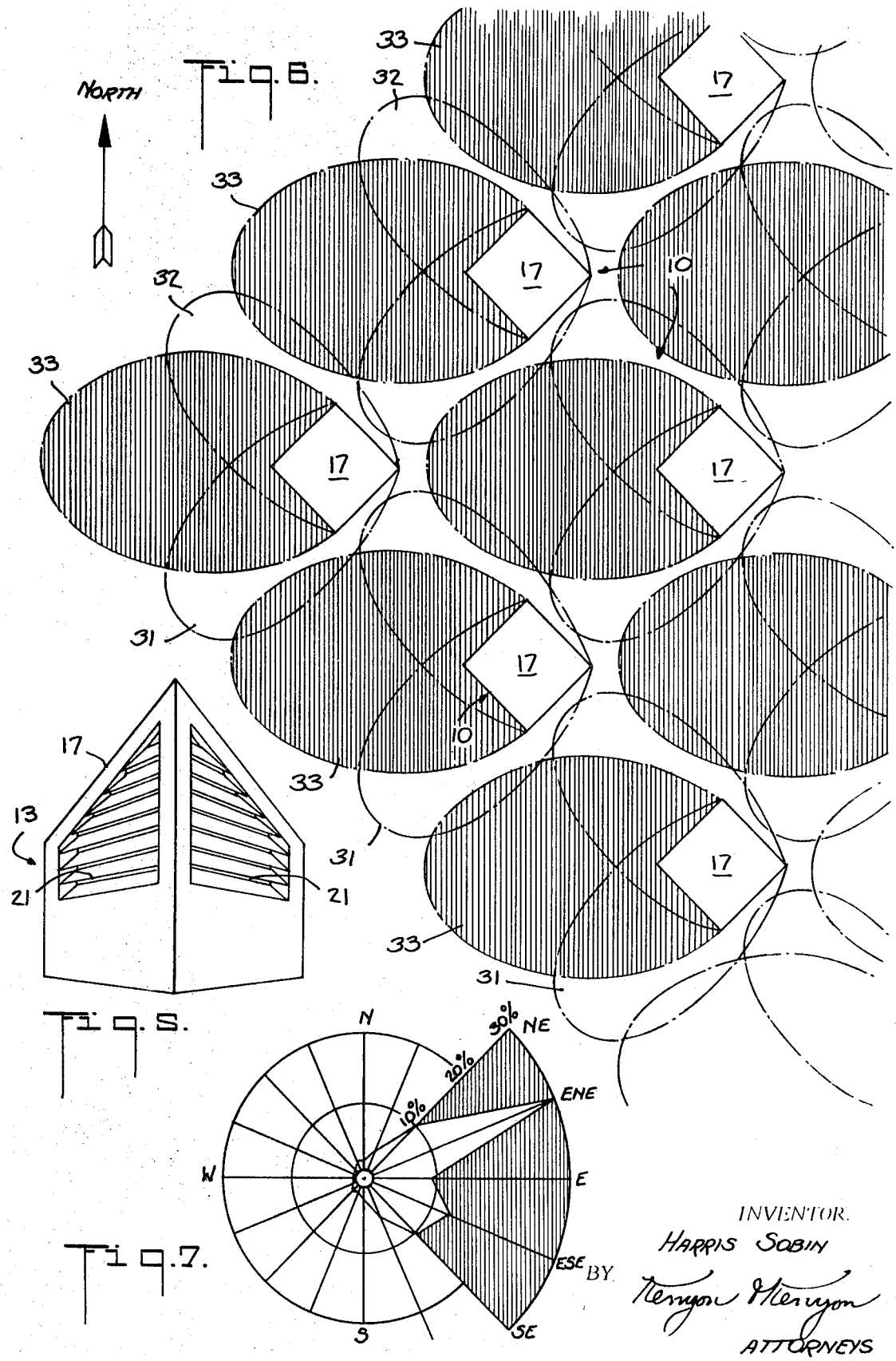

Oct. 26, 1971  H. J. SOBIN  3,614,922
NATURAL AIR COOLING SYSTEM
Filed Sept. 4, 1969  3 Sheets-Sheet 3

INVENTOR.
HARRIS SOBIN
BY
Kenyon & Kenyon
ATTORNEYS

United States Patent Office 3,614,922
Patented Oct. 26, 1971

3,614,922
NATURAL AIR COOLING SYSTEM
Harris J. Sobin, Apt. 720, Carribean Towers, 760 Ponce de Leon Ave., Santurce, Puerto Rico 00907
Filed Sept. 4, 1969, Ser. No. 855,080
Int. Cl. F24f *13/00*
U.S. Cl. 98—32           17 Claims

ABSTRACT OF THE DISCLOSURE

Natural cooling of buildings and their occupants is obtained through the capturing and controlled flow of naturally occurring wind. The wind is directed to flow through the buildings from a positive pressure area to a negative pressure area so as to provide natural cooling by delivering a flow of air across the inhabited portions of the rooms of the buildings.

---

This invention relates to a natural cooling system for buildings. More particularly, this invention relates to a natural air cooling system utilizing the wind for air conditioning purposes in buildings and especially in housing units.

In the construction of buildings, consideration is frequently given to the creation of a comfortable thermal environment. The thermal characteristics or warmth experienced in any environment depends on the net effect of four factors: temperature, humidity, air velocity and radiation. In order to simplify the consideration, these above factors are sometimes summarized in the form of a single value known as effective temperature. Where air temperature is less than body temperature, effective temperature can be lowered either by decreasing air temperature, humidity or radiation, or by increasing air velocity. In housing units for the inhabitants of humid tropical climates, a comfortable thermal condition for human inhabitants typically exists for only a relatively brief portion of the year with indoor effective temperatures usually exceeding the upper limits of human thermal comfort for the remainder of the year. The problem is to design buildings with a view toward lowering effective temperatures, thus increasing the duration of the comfortable thermal condition period. In more affluent areas, the solution to establishing a comfortable thermal condition has relied on the use of mechanical air conditioners capable of lowering air temperature or humidity or both. However, these mechanical air conditioners have been expensive to install, to operate and to maintain. Further, as these air conditioners usually operate to cool a flow of air to a temperature substantially below the normal room temperature and to circulate the resultant cold air flow through a room, drafts of cold air have frequently been created to the discomfort of the room occupants.

Also, where the housing units have been constructed for occupants of low income, mechanical air conditioners have usually been too expensive to use. Thus such housing units have either relied on the use of mechanical fans, or have not used any mechanical form of air conditioner. However, in the case of fans, only small flows of air are caused to flow across relatively limited areas of a room. Also, fans alone do not provide the needed exchange or renewal of indoor air. Further, such air flows are usually not cool but rather are at the ambient temperature of the room in which they occur.

Accordingly, it is an object of the invention to cool the occupants and fabric of a building by utilizing naturally occurring wind.

It is another object of the invention to cool the occupants and fabric of a building with the use of prevailing or trade winds.

It is another object of the invention to cross-ventilate a building with naturally occurring wind while also satisfying the architectural requirements of the building.

It is another object of the invention to increase the duration of comfortable thermal conditions in a building.

It is another object of the invention to provide a plurality of buildings with a natural air cooling system.

It is another object of the invention to provide a relatively low cost means of achieving air cooling of a building or complex of buildings.

It is another object of the invention to air cool a building or complex of buildings without the use of mechanical equipment or other moving parts.

Briefly, the invention provides a system for providing cooling in buildings such as housing units by using naturally occurring winds. The system would be particularly applicable to areas within the zone of the trade winds, such as those known as the Northeast Trades, as these winds have a generally constant velocity, for example, with typical annual average speeds of 8 to 12 miles per hous, as well as a great constancy of direction.

It has been found that the natural wind exhibits a velocity profile in a vertical plane wherein the wind velocity is slowest nearest ground level and faster at higher elevations due to the drag or friction forces induced by the ground. Usually, where there is no ground-based obstruction as in open country, the velocity profile is about parabolic with the wind velocity increasing at a sharply accelerated pace above an elevation of about 20 feet. Where there is an obstacle in the path of the wind as in urban areas, the velocity profile is distorted into a shape which is substantially constant and nearly vertical from the bottom up to the top of the obstacle and which is thereafter parabolic. Further, the wind velocity is generally low or zero at the level of the obstacle especially where there is a large complex of obstacles such as buildings, trees, and the like.

It has also been found that these distortions or vertical portions of the velocity profile correspond to pockets of dead air behind obstacles exposed to the wind. For example, and as determined by wind tunnel tests, where wind flows past an obstacle a wake region or "wind shadow" is created downstream of the obstacle, having an elliptical shape. This dead air space of relatively negative pressure is formed directly behind or downwind of the obstacle. Because of this phenomena, any other structure or obstacle which is directly behind the initial obstacle with respect to the wind direction and within the negative pressure dead air pocket is shielded from the wind and receives very little wind, if any.

Because of the combined effect of the shape of the wind velocity profile and the creation of dead air pockets by the wind shielding effect of one structure on another, the use of wind as a means of ventilation of one or more buildings is usually restricted to providing only dilution ventilation, with typical indoor velocities totally inadequate to provide local comfort cooling or thermal comfort ventilation inside rooms. However, the invention takes advantage of winds, especially trade winds, to provide increased average indoor air flow velocities sufficient to naturally ventilate a building to provide thermal comfort ventilation, i.e. natural cooling of the building interior and occupants.

The system of the invention provides an inlet means such as a wind scoop in a building which serves to receive a flow of wind into the building, a distribution means for conveying and directing the received wind flow through the building interior to achieve local cooling of the occupants of the building, and an outlet means which open to relatively negative pressure areas outside the building to exhaust the air flow. With this system, air is caused to flow continuously, depending upon the continuance of the wind, through the building so as to cool the occupants by convection and evaporation. In this respect, it is noted that the flow of air across the person of an occupant of the building causes a heat transfer to take place between the air and the person. Thus, where the air is below the temperature of the person, a cooling effect is achieved on the person of the occupant. Also, since the flow of air displaces air previously in the building which air is usually at a higher temperature, the overall temperature of the building interior and fabric is lowered by convection.

According to one embodiment of the invention, a building is constructed with a number of enclosed levels. The upper level of the building includes an air tower or wind scoop which has an enclosed space and at least one apertured or louvered wall which faces into the wind so as to admit the wind into the enclosed space. The topmost or upper level further communicates with various ducts throughout the remainder of the building in order to conduct or direct the received wind through the occupied portions or living zone of the building. The lower level or levels of the building, on the other hand, remain within dead air or negative pressure spaces which correspond to the surrounding wind wakes or wind shadows of neighboring buildings. The lower level or levels also communicate the remainder of the building with this surrounding negative pressure space so that the wind flow is systematically drawn out of the building in a controlled path.

The upper level of the building is constructed of sufficient height, for example, at about 20 to 35 feet elevation, so that the air tower or wind scoop projects into a relatively high speed portion of the wind velocity profile and thereby receives an efficient flow of the wind.

The building thus receives an effective and sufficient air flow from the wind and directs the same in a controlled path through the building to cross-ventilate and cool the room therein. Particularly when the wind is a prevailing or a trade wind, a substantially constant air flow or breeze of low speed is caused to flow through the building to cool the building interior by reducing the effective temperature within its rooms.

The invention also provides a building complex arrangement which is naturally air conditioned wherein a number of buildings of about the same height are arranged in a pattern which reduces the wind shielding effect of one building on another. That is, the buildings are disposed with respect to each other in such a way, that the respective air towers or wind scoops fall outside the wind shadows or dead air spaces of each other. Thus, where the wind direction is substantially confined to a known range of paths, such as in the case of the trade winds, the spacing of the buildings is arranged so as to avoid wind shielding effects, and the air towers are designed for maximum efficiency by being pointed into the middle of the directional range. In addition, two walls of this upper level or air tower of each building are arranged to face into the wind at the extremes of the wind direction range so that a substantial air flow is directed into the building at all times regardless of the wind direction within the range.

In other embodiments of the invention, a building of any number of levels can be provided with any suitable inlet means in an upper part of the building exposed to a wind flow in order to receive a flow of air into the building. The distribution system for directing the received flow of air is then constructed with respect to the inlet means to receive and direct the flow of air to various parts of the building in a manner as above described.

These and other objects and advantages of the invention will become more apparent from the following detailed description and appended claims taken in conjunction with the accompanying drawings in which:

FIG. 1 illustrates a vertical cross-sectional view of a building constructed in accordance with the invention;

FIG. 2 illustrates a view taken on line 2—2 of FIG. 1;

FIG. 3 illustrates a view taken on line 3—3 of FIG. 1;

FIG. 4 illustrates a view taken on line 4—4 of FIG. 1 of the lower level of the building;

FIG. 5 illustrates a view of a pair of louvered walls of the air tower of the building of FIG. 1;

FIG. 6 illustrates a plan view of a complex of buildings arranged in a pattern according to the invention;

FIG. 7 illustrates the range of wind direction during a typical year in a typical trade wind area, with percentage time frequencies graphically indicated for 16 compass points;

Figure 8:
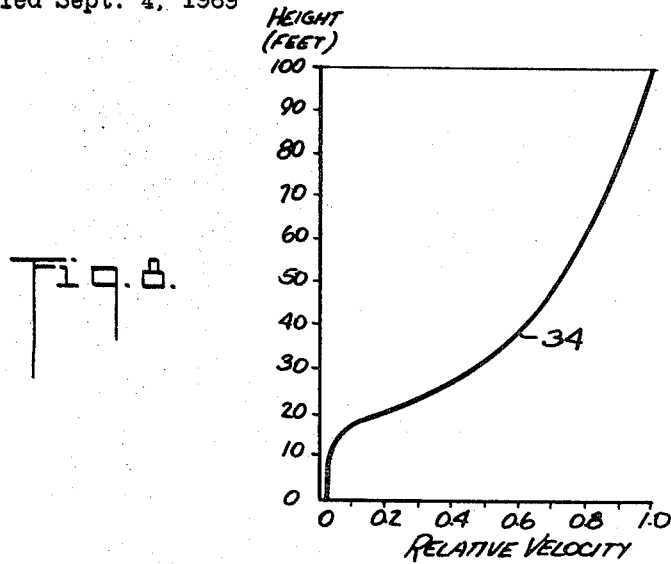
Figure 9:
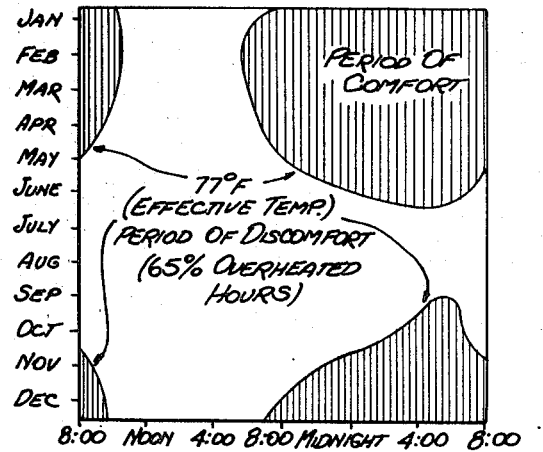
Figure 10:
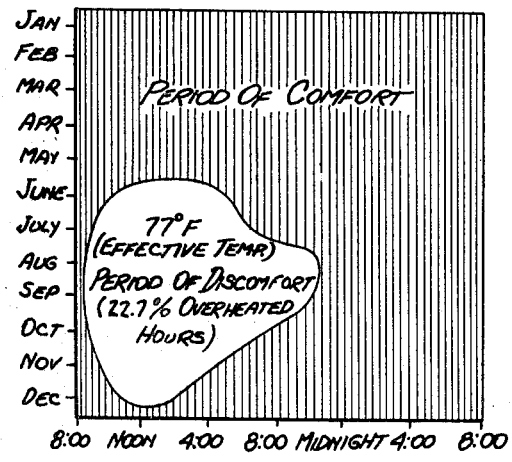

FIG. 8 graphically illustrates a typical velocity profile of the natural wind within a complex of buildings such as the one described in the invention;

FIG. 9 graphically illustrates the relative portion of the hours of a typical year shown by time of day and month of year, which is above or below the upper limit of the thermal comfort zone, i.e., 77° F. effective temperature, inside a building of conventional design in a warm humid trade wind area; and FIG. 10 graphically illustrates the relatively proportion of the hours of a typical year, shown by time of day and month of year, which is above or below the upper limit of the thermal comfort zone, i.e., 77° F. effective temperature, inside a building utilizing the natural ventilation system of the invention.

Referring to FIGS. 1 to 5, a building 10 such as a housing unit is constructed of multi-levels, for example, a lower level 11, intermediate level 12 and an upper level 13. In addition, the building 10 has a central core 14 of polygonal cross-section extending from the lower level 11 through to the upper level 13 and wings which extend from the core 14 in the lower and intermediate levels 11, 12. Also, the lower level 11 includes open spaces 15 around the building 10 which serve, for example, as patios, or pedestrian walkways while functioning as relatively negative pressure areas with respect to the upper levels. Preferably, the open spaces 15 are bordered by surrounding walls 16 or otherwise sunken to increase effectiveness of the open spaces 15 in creating a negative pressure within the spaces.

A natural cooling system is incorporated as an integral part of the building 10 to conduct a flow of air from the naturally occurring wind outside of the building 10 to the interiors of the various levels 11, 12, 13. This system includes an air inlet means in the form of an air tower or wind scoop 17 in the upper level 13 of the core 14 which defines an enclosed space, a distribution means which includes a vertical duct 18 in the intermediate level 12 which communicates at the upper end with the enclosed space of the air tower 17 and a pair of horizontal plenums or ducts 19, 19' which communicates and radiate from the vertical duct 18. The vertical duct 18 which acts as a supply duct has a cross-sectional area of approximately 24 square feet in order to conduct a sufficient air flow for cross-ventilating the building in an efficient manner. One of the horizontal ducts 19 is positioned in the ceiling of the intermediate level 12 and communicates the enclosed space of the air tower 17 with each of the rooms located in the core and wings of the intermediate level 21. The other horizontal duct 19' is positioned in the ceiling of the lower level 11 and communicates the base of the vertical duct 18 with each of the rooms located in the lower level 11. The horizontal ducts 19, 19' open into each of the rooms of the levels 11, 12 through means of adjustable inlet grilles 20 located in the walls of the room near the ceiling. Each of the horizontal ducts 19, 19' is constructed preferably as a plenum or as a dropped ceiling across the ceilings of the levels 11, 12 in the core 14 so that the air flow is distributed substantially uniformly across the ducts 19, 19' to the inlet grilles 20. Thus, an equal flow of air is delivered to each room depending upon the adjustment in the openings in the several grilles 20. Also, the grilles 20 are equipped with deflector blades or turning vanes (not shown) which direct the flow of air into and through those portions of each room most likely to be inhabited or occupied, thus ensuring adequate local comfort cooling for occupants or inhabitants of each room. Also, two walls of the air tower 17 in the upper level 13 of the core 14 are directed into the wind flow and are provided with a louver assembly 21 to admit air from the wind flow into the building 10. The louvers of the louver assembly 21 are inclined in a downward direction when in an open position in order to admit air while blocking entry of rain or wind blown debris. The lower assemblies 21 can be fixed or can be adjustable so as to more effectively control the amount of air deflected downward into the vertical duct 18. Finally, the natural cooling system includes outlet means in the form of window openings equipped with adjustable louver or grille assemblies 23 in exterior walls of levels 11, 12 of the building 10. These openings equipped with louver or grille assemblies 23 permit the flow of air within levels 11 and 12 to pass out into the negative pressure spaces 15.

In use, the building 10 is of a height such that the air tower 17 projects into an area of the velocity profile of a wind wherein the wind is of substantially higher relative velocity than at lower levels. The two walls of the air tower 17 containing the louver assemblies 21 are also disposed to face into the prevailing wind. Thus, upon occurrence of a wind, for example, a trade wind, a flow of air is caused to enter the air tower 17 through one or both of the louver assemblies 21. The air, being under a higher pressure in the air tower 17 within the upper level 13 due to the wind pressure, then flows naturally towards the relatively negative pressure of the open spaces 15 at the rear of the building. That is, the air flow is deflected by the sloped roof 22 which may be inclined on a straight line or on a curvilinear line to enter into the vertical duct 18 and is distributed to the horizontal plenums or ducts 19, 19' in the intermediate and lower levels 11, 12. Thence, the air from the air flow is directed into the living zone or occupied areas of the several rooms through the adjustable inlet grilles 20. In the event that less air velocity is desired in a room, the grille 20 or grilles leading into that room are closed to reduce or even to cut off the air flow. After entry into the several rooms, the air flows towards and through the lower assemblies 23 out of the building 10 and into the negative pressure open spaces 15. The air flow is thus returned to the outside of the building.

Since a trade wind is substantially constant, the air flow through a building situated in a trade wind is likewise constant. Further, as the air flow within the building utilizes only a fraction of the relative velocity of the wind depending upon the building height and wind velocity profile, the air flow through a building as determined by the distribution means assumes a comfortable velocity, for example, about 4 miles per hour.

While useful in isolated buildings, the invention provides particularly valuable advantages when systematically applied to a group of buildings. Referring to FIGS. 6 and 7, the invention permits a complex of buildings 10 based on the invention to be organized in a pattern whereby the wind shielding effect (i.e. wind shadow) of one building on another is substantially eliminated. For example, for a trade wind which typically blows in a direction or range of directions within an easterly facing quadrant for a substantial portion, for example, 80 percent of the hours of a year (FIG. 7), the air towers 17 of the buildings 10 are oriented with the apex of the walls containing the louver assemblies 21 in an easterly direction, that is, towards the middle of the wind direction range quadrant as in FIG. 6. In addition, the air tower 17 of each building is spaced from the air towers 17 of the other buildings by a distance slightly greater than the dead air space or wind shadow which can occur behind an air tower 17 of a building upon occurrence of a wind directly on the opposite forward face of the air tower. That is, as in the case of the embodiment of the invention shown in FIG. 5, for a wind blowing in a northeast direction, each air tower 17 of a building 10 is spaced behind the dead air space 31 of the air tower 17 of the building 10 in front with respect to the wind. Similarly, for a southeast wind, the air towers of the buildings 10 are spaced behind the dead air space 32 of the air towers of the building in front and for an east wind, behind the dead air space 33 of the building in front. Wind tunnel research shows that to achieve this result, the buildings should be organized in such a way that the maximum height of the air tower 17 above the roof of the building is equal to 1.66 times the width of such towers as measured at a right angle to the walls of the tower and the space between two towers as measured at right angles to the walls of both towers is equal to 3 times the width of such towers. Further, as an approximation based on the type of structures shown in FIG. 6, the minimum spacing, height and width of the air towers are such that the tower spacing center-to-center be a minimum of three times the tower width measured at a right angle to the tower walls, and tower height should be 1.66 times tower width also measured at a right angle to tower walls. As shown, the orientation of the buildings allow the reception of an unobstructed air flow through one or both of the air tower walls containing the opened louver assemblies for any direction of wind within the quadrant.

The intermediate levels of the adjacent buildings 10 are disposed in contiguous relation to each other in order to reduce the land usage space for the complex. In addition, the wings of these intermediate levels can extend over passageways defined between the lower levels of the adjacent buildings in order to provide sheltered areas along the passageways.

Referring to FIG. 8, the wind profile 34, i.e., the relative wind velocity plotted against height above ground level of a wind blowing across a complex of buildings 10 where the buildings are of about two or three stories high, assume a shape substantially as shown. That is, up to a height of about 10 feet the wind velocity remains almost constant at about two percent of relative velocity, from a height of between 10 feet and 20 feet the relative velocity increases from 3 to about 20 percent, and over 20 feet increases at a sharp rate. Thus, where the air tower enables the central portion of the louvered inlet openings to be positioned at about 32 feet above the ground, the relative wind velocity available is typically about 25 times greater than that available at mid-elevation levels of ground floor rooms or spaces within the lower level, 11, of the building, and about 10 times greater than that available at mid-elevation levels of second-floor rooms or spaces within the upper level, 12, of the building.

Referring to FIG. 9, a building as above located in a typical warm humid trade wind area and which is not provided with the natural cooling system of the invention will be subjected to periods of thermal discomfort which correspond to those hours which exceed the upper limit of human thermal comfort in such a climate, i.e., 77° F. effective temperature, about 65% of the time during a year. However, for the same building provided with the natural cooling system of the invention and the same warm humid trade wind area, as shown in FIG. 10, the periods of discomfort decrease to about 23% of the time during a year period. The invention thus increases the period of comfort for an individual by a factor of more than 2 times. In the event that an over-cooled condition may occur, the adjustable inlet grilles 20 can be readily closed to reduce or completely cut off the flow of air.

The invention thus provides a natural cooling system which effectively produces a substantially increased period of comfort for the occupants of a building or housing unit without the use of mechanical air conditioners or fans. The natural cooling system allows a gentle breeze developed from the natural wind to constantly move through a building in a controlled manner to lower the effective temperature within the building to comfortable levels without creating a detrimental draft on the occupants.

The invention also provides a cooling system which is of relatively low cost to install in the original construction work of a building and which is of relatively low cost to maintain due to the limited number of movable parts used.

It is noted that while the natural cooling system is particularly adaptable to tropic areas due to the constancy of wind direction and velocity of the trade winds, the system can be used in any other areas where the direction and velocity of the prevailing wind are such as to allow its utilization to air cool a building.

Further, it is noted that by constructing a complex of closely spaced buildings so as to incorporate this system, the usual dead air spaces or wind-shielding effects of one building on another can be greatly reduced or eliminated, thus enabling substantially closer spacing of buildings, which provides correspondingly higher efficiency and intensity of urban land use, i.e., up to 116% or more higher than traditional detached housing, or 68% higher or more than row housing, without sacrifice or penalty whatever in terms of thermal comfort or livability. Also, where a number of building complexes of different heights are to be built, the building complex of lesser height is placed in the wind flow path upstream of the building complex of greater height.

The invention also makes possible the incorporation of an effective natural ventilation and air conditioning system in housing units for low income construction. Thus, the cooling advantages of the trade winds in tropical climates can be conveniently brought to the inhabitants of these climates at relatively low cost. For example, as there are no movable parts in the system, the maintenance costs are substantially reduced. Also, as there is no need to operate the system by means of a power source other than natural occurring wind, the cost of operation is non-existent.

It is further noted that the distribution means for directing the air flow through a building can be of any suitable construction with ducts or outlets leading into various rooms to terminate at various levels within the rooms. For example, the air can be caused to enter a room through a double wall construction having a horizontal grille at a level of about three to three and one-half feet above the floor of the room. This would further ensure that the air flow is directed to the areas where such is most needed.

Thus, the invention provides a system in which efficient cooling and ventilation inside buildings is obtained by means of intercepting high energy, high velocity air occurring naturally at higher levels above such buildings. Also, the air flow or air movement thus provided in the rooms of a building is directed to flow at living or occupancy levels where it is most effective for local cooling of inhabitants as well as of the building fabric itself.

What is claimed is:

1. In combination with a building having an upper level including an enclosed space and at least one wall defining said enclosed space, a natural cooling system for cooling the interior and occupants of said building, said system comprising at least one aperture in said wall for admitting a flow of air into the interior of said upper level from a wind passing over and by said upper level; duct means communicating the interior of said upper level with the remainder of said building for conducting the flow of air from said upper level, said duct means including at least one adjustable inlet grille therein for directing the flow of air from said duct means into said remainder of said building to reduce the effective temperature therein for cooling of the occupants therein, and at least one outlet means in a lower level of said building communicating the interior of said building with a relatively negative pressure area at the exterior of said building to exhaust the flow of air.

2. The combination as set forth in claim 1 wherein said building has at least one lower level below said upper lever and includes a vertically disposed core passing through said upper level and said lower level, said core defining a room in said lower level and an enclosed space in said upper level defining the interior of said upper level, and at least one wing extending from said core in said lower level and enclosing at least one room therein, and said distribution means includes a vertical duct extending through said core in communication with said enclosed space of said upper level, a horizontal duct in the top of said lower level room of said core for distributing the flow of air from said vertical duct therein, and an adjustable grille means in each room of said lower level in communication with said horizontal duct for dispensing a flow of air into the interior of each said room.

3. The combination as set forth in claim 2 wherein said lower level includes a wall in said core having a louver assembly therein defining said aperture in said lower level.

4. The combination as set forth in claim 2 wherein said building includes at least one intermediate level between said upper level and said lower level, said intermediate level having at least one wing extending from said core and defining a room therein, and wherein said duct assembly communicates with the interior of said intermediate level.

5. The combination as set forth in claim 1 wherein said outlet means includes a second wall adjacent to said negative pressure space, and wherein said system includes and adjustable louver assembly in said one wall defining said aperture in said upper level and communicating said enclosed space with the exterior of said wall for passage of the flow of air into said enclosed space and a louver assembly in said second wall defining said aperture in said second wall communicating the interior of said building with said relatively negative pressure space.

6. The combination as set forth in claim 5 wherein said building includes a wall peripherally surrounding said negative pressure space.

7. The combination as set forth in claim 5 wherein said upper level includes an inclined roof opposite said wall for directing the received flow of air downwardly.

8. A natural cooling system for a building comprising an air wind scoop or air tower having at least one aperture therein extending upwardly from the building to project into and face a wind moving past the building for receiving a flow of air from the wind, distribution means for directing the received flow of air from said air scoop through the building to cool the occupants therein by convection of evaporation as well as the building fabric by convection and thence into a relatively negative pressure space exteriorly of the building, outlet means communicating the interior of the building with the relatively negative pressure space exteriorly of the building for exhausting of the flow of air from the building into said space, and means enclosing the negative pressure space.

9. A natural cooling system as set forth in claim 8 wherein said air scoop extends upwardly into the wind to a level in the velocity profile of the wind representing a relative velocity of up to 25 times greater than the wind velocity near mid-elevation of the building.

10. A natural cooling system as set forth in claim 9 wherein said air scoop extends upwardly a distance of about 20 feet to 40 feet over the elevation of the building.

11. A natural cooling system as set forth in claim 8 wherein said air scoop includes a pair of adjacent walls defining an apex and having openings therein to receive the flow of air, said walls pointing said apex into the mid-point direction of a substantially constant range of wind directions.

12. A natural cooling system as set forth in claim 8 wherein said air scoop is polygonal in cross-section to define an enclosed space and includes a pair of adjacent walls, each said wall having a louver assembly therein exposed to the wind for regulating the flow of air into said enclosed space.

13. A natural cooling system as set forth in claim 12 wherein said means for directing the received flow of air includes a vertically disposed duct communicating with said enclosed space, a plurality of said horizontal duct disposed on different horizontal planes with respect to each other, and communicating with said vertical duct for distributing the flow of air therein across the interior of the building, and adjustable means in each said horizontal duct for dispensing the distributed flow of air into the interior of the building.

14. A natural cooling system as set forth in claim 8 wherein said means for directing the received flow of air includes at least one vertically disposed duct in communication at one end with said aperture means, at least one horizontal duct in communication with the opposite end of said vertical duct for distributing the flow of air therein cross the interior of the building, and an adjustable grille means in said horizontal duct for dispensing distributed flow of air into the interior of the building.

15. A complex of buildings, each said building having an upper level projecting upwardly into a wind and a natural cooling system; said natural cooling system including an aperture in said upper level for directing a flow of air from the wind passing over and by said building into said building, duct means communicating the interior of said upper level with the remainder of said building for conducting the flow of air from said upper level into said remainder of said building to reduce the effective temperature therein for cooling of the occupants therein, and outlet means in a lower level of said building communicating with a relatively negative pressure area at the exterior of said building to exhaust the flow of air; and each said upper levels of said buildings being disposed in spaced relation to an adjacent upper level a distance slightly greater than the wind shadow occurring behind said adjacent upper level upon occurrence of a wind directly on the opposite face of said adjacent upper level whereby each said aperture of said natural cooling system is substantially constantly exposed to an unobstructed flow of air from the wind.

16. A complex of buildings as set forth in claim 15 wherein each said building includes at least two levels below said upper level and wherein said natural cooling system directs a flow of air through each of said levels.

17. A complex of buildings as set forth in claim 15 wherein each said upper level of a respective building extends upwardly into the wind to a level in the velocity profile of the wind representing a relative velocity of up to 25 times greater than the wind velocity prevailing near mid-elevation of said lower levels.

References Cited
UNITED STATES PATENTS

| | | | |
|---|---|---|---|
| 281,286 | 7/1883 | Moore | 98—35 |
| 371,180 | 10/1885 | Simpson | 98—32 |
| 371,180 | 10/1887 | Dexter | 98—32 |
| 588,969 | 8/1897 | Finagan | 98—35 |
| 2,356,391 | 8/1944 | Fluor | 98—32 |
| 2,470,201 | 5/1949 | Werner | 98—42 |
| 3,299,798 | 1/1967 | Nabben | 98—37 |

WILLIAM J. WYE, Primary Examiner

U.S. Cl. X.R.

98—33, 29, 63, 62

UNITED STATES PATENT OFFICE
CERTIFICATE OF CORRECTION

Patent No. 3,614,922      Dated October 26, 1971

Inventor(s) Harris J. Sobin

It is certified that error appears in the above-identified patent and that said Letters Patent are hereby corrected as shown below:

Column 1, line 3, change the inventor's address to read:

-- 6550 N. Skyway Rd.
           Tucson, Arizona 85718 --

Column 2, line 20, change "hous" to --hours--

Signed and sealed this 7th day of March 1972.

(SEAL)
Attest:

EDWARD M. FLETCHER, JR.          ROBERT GOTTSCHALK
Attesting Office                     Commissioner of Patents